(12) United States Patent
Sharma et al.

(10) Patent No.: US 11,423,587 B2
(45) Date of Patent: Aug. 23, 2022

(54) FREEFORM GRADIENT STYLE BLENDING

(71) Applicant: Adobe Inc., San Jose, CA (US)

(72) Inventors: Avadhesh Kumar Sharma, Jhunjhunu (IN); Arzoo Kashyap, Noida (IN)

(73) Assignee: Adobe Inc., San Jose, CA (US)

( * ) Notice: Subject to any disclaimer, the term of this patent is extended or adjusted under 35 U.S.C. 154(b) by 281 days.

(21) Appl. No.: 16/453,771

(22) Filed: Jun. 26, 2019

(65) Prior Publication Data
US 2020/0410724 A1 Dec. 31, 2020

(51) Int. Cl.
*G06T 11/00* (2006.01)
(52) U.S. Cl.
CPC .................................. *G06T 11/001* (2013.01)
(58) Field of Classification Search
None
See application file for complete search history.

(56) References Cited

U.S. PATENT DOCUMENTS

| 6,313,840 B1 * | 11/2001 | Bilodeau | G06T 15/04 345/423 |
| 2005/0012750 A1 * | 1/2005 | Uesaki | G06T 17/30 345/531 |

* cited by examiner

*Primary Examiner* — Aaron M Richer
(74) *Attorney, Agent, or Firm* — FIG. 1 Patents

(57) ABSTRACT

In implementations of freeform gradient style blending, a blending system detects a first color point at a first location in digital content, the first color point at least partially defining color diffusion of a first freeform gradient of a first object. The system identifies a second location in the digital content with respect to a second freeform gradient of a second object based on the first location. The system detects a second color point of a plurality of color points that at least partially define color diffusion of the second freeform gradient, the detecting based on a proximity of the second color point to the second location. A blend object of the first and second objects is generated by interpolating the first color point and the second color point.

20 Claims, 13 Drawing Sheets
(9 of 13 Drawing Sheet(s) Filed in Color)

300

302
Identify at least one color point of a first freeform gradient of a first object and at least two color points of a second freeform gradient of a second object

304
Generate a first grid on the first object and a second grid on the second object, the first grid and the second grid having an equal number of grid elements

306
Identify a grid element of the first grid having the at least one color point of the first freeform gradient

308
Map the grid element of the first grid to a corresponding grid element of the second grid

310
Determine a nearest color point of the second grid to the corresponding grid element, the nearest color point one of the at least two color points of the second freeform gradient

312
Interpolate the at least one color point of the first freeform gradient and the nearest color point of the at least two color points of the second freeform gradient to generate a blend object of the first object and the second object

*Fig. 3*

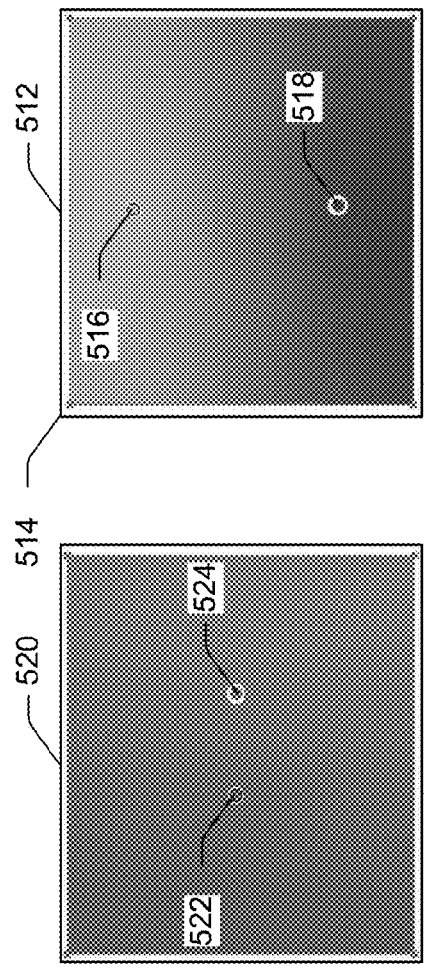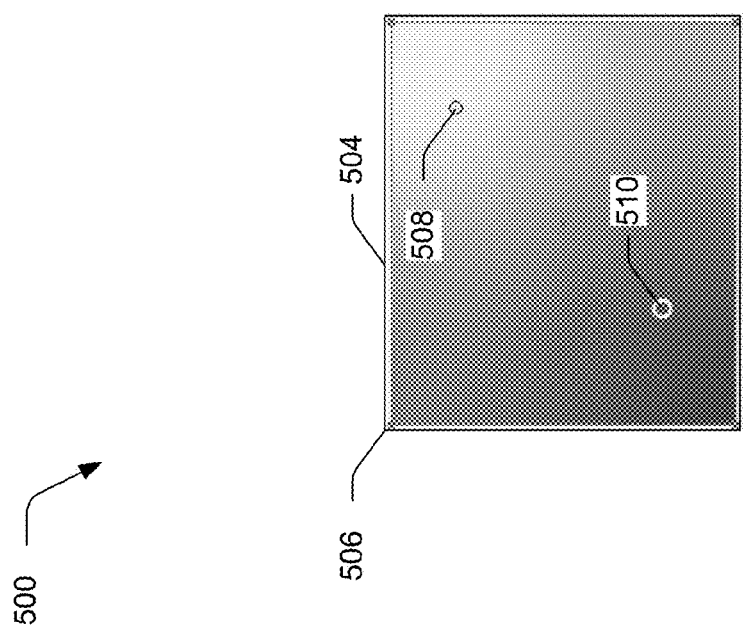
Fig. 5A

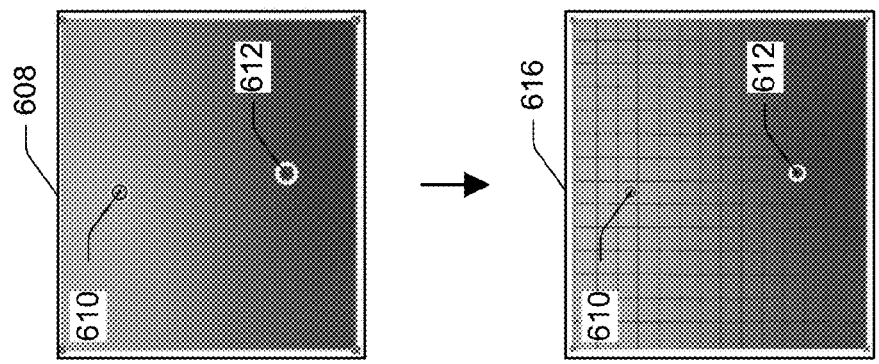
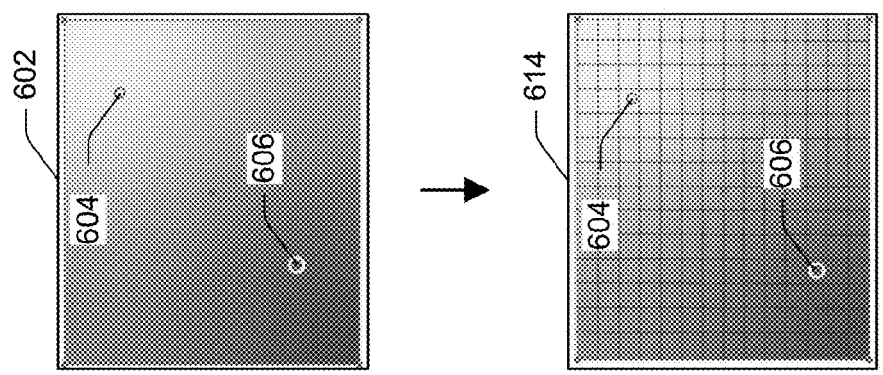
Fig. 6

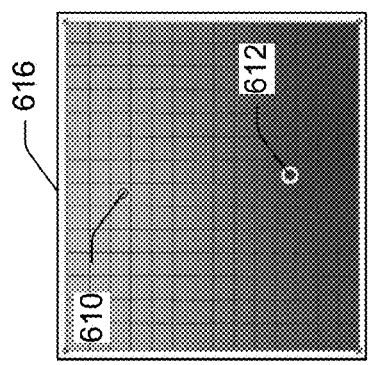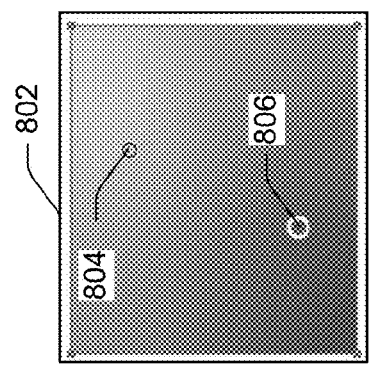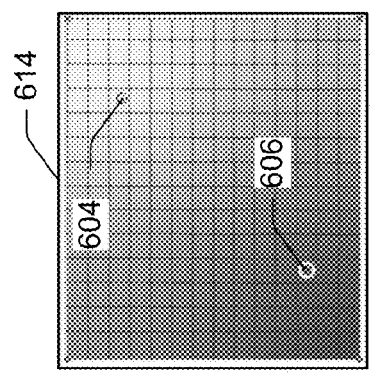
Fig. 8

900

902
Detect a first color point at a first location in a first freeform gradient, the first color point at least partially defining color diffusion of the first freeform gradient of a first object

904
Identify a second location in a second freeform gradient of a second object based on the first location

906
Detect a second color point of a plurality of color points that at least partially define color diffusion of the second freeform gradient, the detecting based on a proximity of the second color point to the second location

908
Generate a blend object of the first and second object by interpolating the first color point and the second color point

910
Render the blend object in a user interface of a display device

*Fig. 9*

FREEFORM GRADIENT STYLE BLENDING

BACKGROUND

In digital drawing and painting systems, a blend object is created as a visual combination of two or more objects, and this visual combination is treated as a single object. Conventional systems can render blend objects from input objects to create and distribute shapes evenly between the input objects, create smooth geometrical transitions between the input objects, and create color transitions between the input objects. These conventional systems can create blends between objects with multiple appearance effects including patterns and symbols, and blend objects may also be used to create smooth transitions between open path objects. However, there are some limitations to blend functionality provided by conventional drawing and painting systems. For example, blends of objects with patterns can only use the fill of an object on the topmost layer and blends of objects with multiple appearance attributes are often not visually pleasing.

Conventional systems also do not provide blend functionality for complex objects such as objects having freeform gradients. Freeform gradients are a type of gradient that can be used to create a mixture of colors within a geometry of an object in an ordered or random sequence such that the color mixture appears smooth and natural. These gradients are created by arranging color points which are also referred to as color stops on a mesh of an object. Each color point has an associated color value, and conventional systems use the color values to interpolate colors to generate the freeform gradients within the geometry of the object. Specifically, conventional systems can use the color values to interpolate colors on each vertex of the mesh for smooth color diffusion. In this manner, the color points define color diffusion for the freeform gradients. However, conventional drawing and painting systems do not support blending of objects having freeform gradients. Accordingly, the inability to blend objects having freeform gradients presents a technological problem in the field of digital drawing and painting.

SUMMARY

Systems and techniques are described for freeform gradient style blending. A computing device implements a blending system which identifies color points of a first freeform gradient of a first object. The blending system also identifies color points of a second freeform gradient of a second object. The color points of the first freeform gradient define color diffusion for the first freeform gradient and the color points of the second freeform gradient define color diffusion for the second freeform gradient.

The blending system detects a first color point of the first freeform gradient at a first location in digital content. The system identifies a second location in the digital content with respect to the second freeform gradient based on the first location. The system also detects a second color point of the second freeform gradient based on a proximity of the second color point to the second location in the digital content. The first color point and the second color point are interpolated by the system to generate a blend object of the first object and the second object, and the blend object is rendered as part of the digital content.

The systems and techniques described herein improve digital painting and drawing technology by enabling generation of blend objects from objects having freeform gradients. Conventional systems do not support such functionality. Additionally, the described systems enable automatic computation of features of blend objects and adjustments to these features in real time based on adjustments to a freeform gradient of an input object or input objects.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures may be indicative of one or more entities and thus reference may be made interchangeably to single or plural forms of the entities in the discussion.

FIG. 3 is a flow diagram depicting a procedure in an example implementation in which a first freeform gradient of a first object and a second freeform gradient of a second object are interpolated based on a color point of the first freeform gradient and a corresponding color point of the second freeform gradient.

FIGS. 5A and 5B are illustrations depicting examples of blend objects generated from freeform gradients.

FIG. 6 is an illustration depicting an example representation of generating a first grid on a first object and a second grid on a second object.

FIG. 8 is an illustration depicting an example representation in which color points of a first freeform gradient and corresponding color points of a second freeform gradient are interpolated to generate a blend object.

FIG. 9 is a flow diagram depicting a procedure in an example implementation in which a blend object is generated of a first object having a first freeform gradient and a second object having a second freeform gradient.

DETAILED DESCRIPTION

Overview

Figure 1:
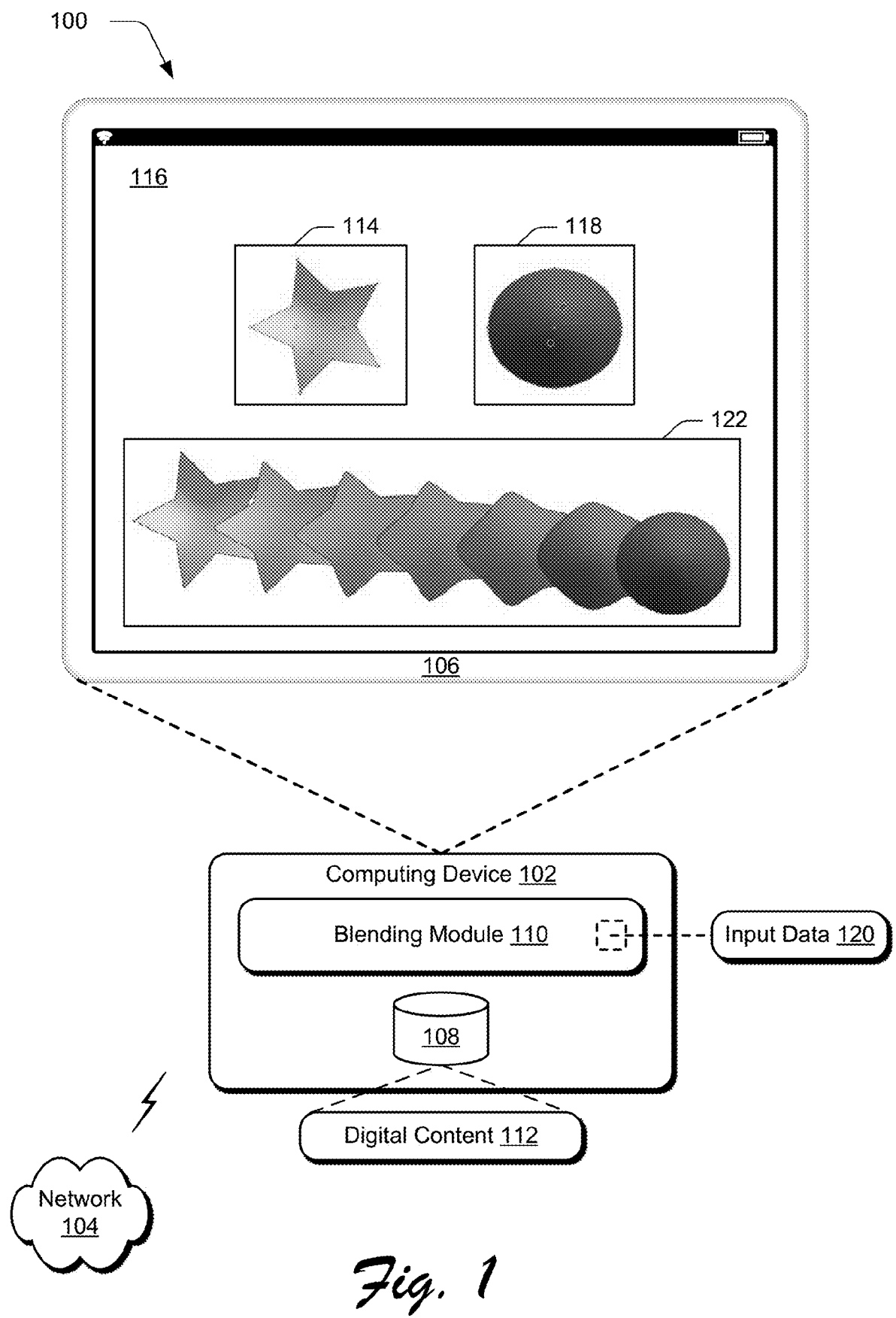
FIG. 1 is an illustration of an environment in an example implementation that is operable to employ digital systems and techniques as described herein.

Blend objects are used to create visual combinations of two or more objects. Conventional techniques used to generate blend objects, however, produce blend objects that are not visually pleasing in some instances. This is often the case in scenarios where an input object has multiple features or complicated features, such as freeform gradients. Freeform gradients are a type of gradient that can be used to create a mixture of colors within a geometry of an object in an ordered or random sequence such that the color mixture appears smooth and natural. These gradients are created by arranging color points on a mesh of an object. Each color point has an associated color value, and conventional systems use the color values to interpolate colors to generate the freeform gradients within the geometry of the object. However, conventional blend object techniques are not capable of addressing freeform gradients in manner that preserves a smooth and natural color mixture.

Accordingly, systems and techniques are described for freeform gradient style blending. A computing device implements a blending system which includes an identification module, a grid module, a style mapping module, and an interpolation module. The identification module receives input data which includes a first object having a first freeform gradient and a second object having a second freeform gradient, and the identification module generates first object style data and second object style data based on the input data.

The first object style data may include a geometry of the first object, colors of the first object, a number and location of color points of the first freeform gradient, and a weight or value associated with each of the color points of the first freeform gradient. Similarly, the second object style data can include a geometry of the second object, colors of the second object, a number and location of color points of the second freeform gradient, and a weight or value associated with each of the color points of the second freeform gradient. The first object style data includes a first color point of the first freeform gradient at a first location in digital content.

The grid module receives the first object style data and the second object style data and the grid module is implemented to identify a second location in the digital content with respect to the second freeform gradient. The grid module generates first object grid data and second object grid data which describes two-dimensional grids of the first object and the second object, respectively. These two-dimensional grids are of equal size such that all color points of the first freeform gradient correspond to a grid element of the grid of the first object and all color points of the second freeform gradient correspond to a grid element of the grid of the second object. The second object grid data can include the second location in the digital content.

The style mapping module receives the first object grid data and the second object grid data, and the style mapping module identifies a corresponding color point in the grid of the second object with respect to a grid element of the first object having the first color point. The style mapping module detects a second color point of the second freeform gradient based on a proximity of the second color point to the second location. This module associates the first color point of the first freeform gradient and the second color point of the second freeform gradient for interpolation and the style mapping module generates first object data and mapped second object data describing this association. The interpolation module receives the first object data and the mapped second object data, and this module interpolates the first color point of the first freeform gradient and the color point of the second freeform gradient to generate a blend object from the first object and the second object.

The systems and techniques described herein improve digital painting and drawing technology by enabling generation of blend objects from objects having freeform gradients. These systems are capable of generating blend objects that are not only visually pleasing but also have features to visually indicate that the blend objects are combinations of first and second input freeform gradients. Conventional systems are not capable of providing such functionality. Additionally, the described systems enable automatic computation of features of blend objects and adjustments to these features in real time based on adjustments to a freeform gradient of an input object or input objects.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud" meaning that applications and/or data that can be utilized while computer processing is executed on servers that are remote from the computing device 102.

The illustrated environment 100 also includes a display device 106 that is communicatively coupled to the computing device 102 via a wired or a wireless connection. A variety of device configurations may be used to implement the computing device 102 and/or the display device 106. The computing device 102 includes a storage device 108 and a blending module 110. The storage device 108 is illustrated to include digital content 112. An example of the digital content 112 is a first object 114 having a first freeform gradient which is displayed in a user interface 116 on the display device 106. Another example of digital content 112 is a second object 118 having a second freeform gradient which is also displayed in the user interface 116.

As shown in FIG. 1, the first freeform gradient has a first style defined by its geometry and four color points and the second freeform gradient has a second style defined by its geometry and two color points. As illustrated, locations of the four color points within the geometry of the first object 114 as well as color values associated with each of the four color points define color diffusion for the first freeform gradient. This color diffusion may be defined differently by, e.g., changing a location of a color point within the geometry of the first object 114 or changing a color value of a color point. Similarly, locations of the two color points within the geometry of the second object 116 along with color values of the two color points define color diffusion for the second freeform gradient. In this example, the first freeform gradient has a total number of color points which is different from a total number of color points of the second freeform gradient. Also in this example, the first object 114 has a star shaped geometry which is different from the geometry of the second object 118 which is oval shaped.

Aspects of the first object 114 and the second object 118 may be included in input data 120. For example, the input data 120 can include user inputs selecting the first and the second object and/or inputting the first and/or the second object. The blending module 110 is illustrated as having, receiving, and/or transmitting input data 120. For example, the computing device 102 may implement the blending module 110 to receive the input data 120 which can include the first object 114 and the second object 118, and the blending module 110 can generate a blend object 122 based on the style of the first freeform gradient of the first object 114 and the style of the second freeform gradient of the second object 118. This blend object 122 is displayed in the user interface 116 along with the first object 114 and the second object 118. As shown, the blend object 122 includes a visual transition between geometries and color diffusion patterns of the first object 114 and the second object 118.

Figure 2:
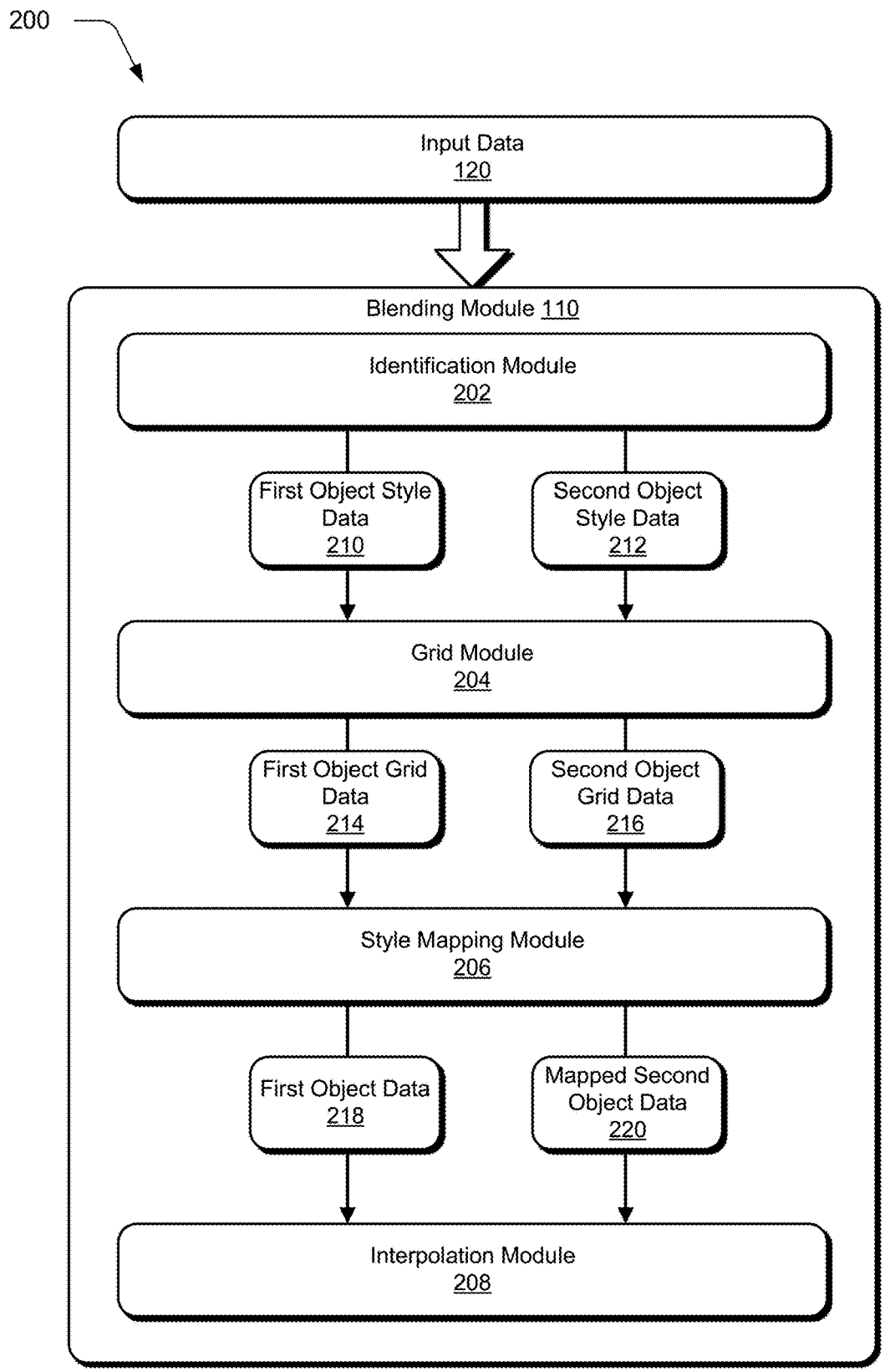
FIG. 2 depicts a system in an example implementation showing operation of a blending module.

FIG. 2 depicts a system 200 in an example implementation showing operation of a blending module 110. The blending module 110 is illustrated to include an identification module 202, a grid module 204, a style mapping module 206, and an interpolation module 208. Briefly, and using the example shown in FIG. 1, a first object 114 has a first geometry and a first freeform gradient, and color diffusion of the first freeform gradient is defined by locations of color points in the first geometry and color values of the color points. Continuing this brief example, a second object 118 has a second geometry and a second freeform gradient, and color diffusion of the second freeform gradient is defined by locations of color points in the second geometry and color values of these color points. In this brief example, the identification module 202 can identify the color points of the first freeform gradient and the color points of the second freeform gradient, and the grid module 204 can generate a first grid on the first geometry and a second grid on the second geometry such that the first grid and the second can have an equal number of grid elements. The style mapping module 206 can leverage the grid elements of the first and second grid by mapping coordinates of a grid element of the first grid having a color point of the first freeform gradient to a corresponding grid element of the second grid having the coordinates of the grid element of the first grid. In one example, the style mapping module 206 may identify a nearest color point of the second freeform gradient to the corresponding grid element of the second grid, and the style mapping module 206 can associate the color point of the first freeform gradient with the identified color point of the second freeform gradient. The style mapping module 206 may then map coordinates of another grid element of the first grid having another color point of the first freeform gradient to another corresponding grid element of the second grid to identify another color point of the second freeform gradient for association with the other color point of the first freeform gradient until each color point of the first freeform gradient is associated with a color point of the second freeform gradient. In this brief example, the interpolation module 208 can generate a blend object 122 of the first object 114 and the second object 118 by interpolating associated color points of the first and second freeform gradients.

In a detailed example, the computing device 102 implements the blending module 110 to receive input data 120, e.g., the blending module 110 may receive the input data 120 over the network 104 or based on user inputs received by the computing device 102 via the user interface 116. In one or more implementations, the identification module 202 may receive the input data 120 and the identification module 202 may process the input data 120 to generate first object style data 210 and second object style data 212.

In an example, the identification module 202 is implemented to determine whether a total number of color points of a first freeform gradient of a first input object is less than or equal to a total number of color points of a second freeform gradient of a second input object. In one example in which the total number of color points of the first freeform gradient of the first input object is less than or equal to the total number of color points of the second freeform gradient of the second input object, the identification module 202 can be implemented to treat the first input object as the first object and the second input object as the second object. In an example in which the identification module 202 determines that the total number of color points of the first freeform gradient is not less than or equal to the total number of color points of the second freeform gradient, the identification module 202 is implemented to change an order of the first and second input objects such that the first input object is treated as the second object and the second input object is treated as the first object.

Continuing the example from FIG. 1, the freeform gradient of the first object 114 has four color points while the freeform gradient of the second object 118 has two color points. As a result, the identification module 202 may designate the second object 118 as the first object and the first object 114 as the second object. In this way, the identification module 202 ensures that the first object and its freeform gradient always has a total number of color points that is less than or equal to a total number of color points of the second object and its freeform gradient.

For example, the first object style data 210 may describe the first object 114 having the first freeform gradient. In particular, the first object style data 210 may include a geometry of the first object, colors of the first object, a number and location of color points of the first freeform gradient, and a weight or value associated with each of the color points of the first freeform gradient. Similarly, the second object style data 212 can describe the second object 118 having the second freeform gradient. In this way, the second object style data 212 can include a geometry of the second object, colors of the second object, a number and location of color points of the second freeform gradient, and a weight or value associated with each of the color points of the second freeform gradient. As illustrated, the identification module 202 may receive the input data 120 and the identification module 202 can generate the first object style data 210 and the second object style data 212 based on the input data 120.

The grid module 204 is illustrated as receiving the first object style data 210 and the second object style data 212, and the grid module 204 can be implemented to generate grids. A grid is generally a system for structuring content which includes a plurality of discrete grid elements. The grid can serve as a framework for identifying features of digital content which can be referenced in terms of particular grid elements having the features. For example, the grid may be a two-dimensional matrix of grid elements each of which is uniquely identifiable by coordinates of the grid. In this manner, the grid module 204 can generate grids on objects and coordinates of grid elements of these grids can be used to map a spatial location of a feature in one object to a corresponding spatial location in another object by mapping coordinates of a grid element having the one object to a corresponding grid element of the other object.

In one or more implementations, the grid module 204 may generate a first grid on the first object 114 and a second grid on the second object 118. For example, the first grid and the second grid may have an equal number of grid elements. In one example, the grid module 204 may be implemented to identify a grid element of the first grid having a color point of the first freeform gradient. In this example, the color point of the first freeform gradient can be any color point of the first freeform gradient. In another example, the grid module 204 may identify the color point of the first freeform gradient and determine a grid element having the color point. In this example, the color point may be randomly selected from color points of the first freeform gradient. In this way, the determined grid element can represent a location of the color point in digital content.

In another example, if portions of the color point are disposed in multiple grid elements of the first grid, then the grid module 204 may determine a grid element having the majority of the color point as the grid element having the color point. In an example in which the color point is disposed in multiple grid elements of the first grid and no single grid element has a majority of the color point, e.g., the color point may be equally disposed in the multiple grid elements, the grid module 204 may determine a default grid element as the grid element having the color point. Consider an example in which the color point is disposed equally in four grid elements, the grid module 204 may determine an upper left grid element of the four grid elements as the grid element having the color point.

The grid module may generate first object grid data 214 based on the first object style data 210 and second object grid data 216 based on the second object style data 212. For example the first object grid data 214 can describe the first grid and the second object grid data 216 may describe the second grid. In one example, the first object grid data 214 includes the grid element of the first grid having the color point of the first freeform gradient, and this grid element represents a location of the color point in the digital content. In an example in which the first freeform gradient has multiple color points, the first object grid data 214 can include grid elements of the first grid having color points of the multiple color points. In one or more implementations, the first object grid data 214 may include the first object style data 210 and second object grid data 216 may include the second object style data 212. In an example, the first object grid data 214 and the second object grid data 216 can also include the input data 120.

The style mapping module 206 is illustrated as receiving the first object grid data 214 and the second object grid data 216. For example, the style mapping module 206 may be implemented to receive the first object grid data 214 including the grid element of the first freeform gradient having the color point, and this grid element represents a location of the first color point in the first object. The style mapping module 206 may process the first object grid data 214 and the second object grid data 216 to map the grid element having the color point of the first freeform gradient to a corresponding grid element of the second grid. This corresponding grid element of the second grid may represent a location in the second object corresponding to the location of the first color point in the first object.

Consider an example in which the first and second grids are two-dimensional grids such that any grid element of the first grid may be uniquely identified by a pair of coordinates. For example, the grid element of the first grid having the color point may have (I, J) coordinates of I=3 and J=11. In this example, the corresponding grid element of the second grid would be the grid element having the (I, J) coordinates of I=3 and J=11 of the second grid. Continuing this example, the style mapping module 206 may map the grid element of the first grid to a grid element of the second grid having the coordinates of the grid element of the first grid. In this manner, the grid element of the second grid can be the corresponding grid element which represents a location in the second object spatially corresponding to a location of the first color point in the first object.

In one or more implementations, the style mapping module 206 is generally implemented to associate color points of the first and second freeform gradients based on a spatial distribution of the color points. As part of this association, the style mapping module 206 can leverage the first object grid data 214 and the second object grid data 216 to locate a color point of the second freeform gradient that is in closest proximity to a gird element of the second grid which corresponds to a grid element of the first grid having a color point of the first freeform gradient. In this way, the style mapping module 206 receives coordinates of a grid element of the first grid having a color point of the first freeform gradient, and the style mapping module 206 identifies a corresponding grid element of the second grid having the coordinates of the gird element of the first grid.

The style mapping module 206 may be implemented to determine if the corresponding grid element of the second grid has a color point of the second freeform gradient. In an example in which the corresponding grid element of the second grid does have a color point of the second freeform gradient, then this color point is the closest color point in proximity to the corresponding grid element of the second grid because it is contained within the corresponding grid element of the second grid. In this example, the color point of the second freeform gradient is associated with the color point of the first freeform gradient. In this manner, the style mapping module 206 detects the color point of the second freeform gradient based on a proximity of the color point of the second freeform gradient to a location represented by the corresponding grid element. Thus, in examples in which the corresponding grid element of the second grid has a color point of the second freeform gradient, then this color point will be the closest color point to the corresponding grid element of the second grid.

In particular, the style mapping module 206 may detect the color point of the second freeform gradient as being in closest proximity to the corresponding grid element relative to other color points of the second freeform gradient. Consider an example in which the second freeform gradient includes a first color point and a second color point and the corresponding element of the second grid does not have the first color point or the second color point. Continuing this example, the first color point may be a first distance from the corresponding element of the second grid and the second color point may be a second distance from the corresponding element of the second grid such that the first distance is greater than the second distance. In this example, the style mapping module 206 determines that the second color point is closer in proximity to the corresponding grid element of the second grid than the first color point.

For example, the style mapping module 206 may be implemented to generate first object data 218 and mapped second object data 220. In this example, the first object data 218 and the mapped second object data 220 may describe the association of the color point of the first freeform gradient and the color point of the second freeform gradient. Thus, the style mapping module 206 generates an order of interpolation of color points of the first freeform gradient and color points of the second freeform gradient. In some examples, the mapped second object data 220 describes the order of interpolation of color points of the first freeform gradient and color points of the second freeform gradient.

If the corresponding grid element of the second grid does not have a color point of the second freeform gradient, then the style mapping module 206 determines whether a neighboring grid element of the corresponding grid element has a color point of the second freeform gradient. If the neighboring grid element has a color point of the second freeform gradient, then this color point is associated with the color point of the first freeform gradient. In this manner, the style mapping module 206 detects the color point of the second freeform gradient based on a proximity of the color point to a location represented by the corresponding grid element.

For example, the mapped second object data 220 may describe the association of the color point of the first freeform gradient and the color point of the second freeform gradient. If the neighboring grid element does not have a color point of the second freeform gradient, then the style mapping module 206 determines whether another neighboring grid element of the corresponding grid element has a color point of the second freeform gradient. In this way, the style mapping module 206 gradually increases proximity with respect to the location represented by the corresponding grid element to detect a color point that is closest in proximity to the corresponding grid element.

The style mapping module 206 continues to determine whether neighboring grid elements of the corresponding grid element have a color point of the second freeform gradient until a nearest grid element of the second grid to the corresponding grid element having a color point of the second freeform gradient is determined. When the nearest grid element of the second grid to the corresponding grid element having the color point of the second freeform gradient is determined, the style mapping module 206 is implemented to associate the color point of the first freeform gradient and the color point of the second freeform gradient. For example, the style mapping module 206 can generate first object data 218 and mapped second object data 220 describing an association of the color point of the first freeform gradient and the color point of the second freeform gradient.

Consider an example in which the first object data 218 includes multiple grid elements of the first grid having a color point of multiple color points of the first freeform gradient. In this example, the association of the color point of the first freeform gradient and the color point of second freeform gradient is an association of a first color point of the first freeform gradient and a first color point of the second freeform gradient. Continuing this example, the style mapping module 206 can be implemented to map a second grid element of the first grid having a second color point to a second corresponding grid element of the second grid. The second grid element can represent a location of the second color point in digital content and the corresponding grid element of the second grid can represent a location corresponding to the location of the second color point in the digital content. The style mapping module 206 determines whether the second corresponding grid element has a second color point of the second freeform gradient. In one example, the style mapping module 206 may exclude the first color point of the second freeform gradient from this determination as the first color point of the second freeform gradient may already be associated with the first color point of the first freeform gradient.

If the second corresponding grid element has a second color point of the second freeform gradient, then the second color point of the second freeform gradient is associated with the second color point of the first freeform gradient. In this way, the style mapping module 206 may detect the second color point of the second freeform gradient based on a proximity of the second color point to the location represented by the corresponding grid element of the second grid. For example, the style mapping module 206 is implemented to associate the second color point of the first freeform gradient and the second color point of the second freeform gradient. The first object data 218 and the mapped second object data 220 may describe the association of the first color point of the first freeform gradient and the first color point of the second freeform gradient. The first object data 218 and the mapped second object data 220 can also describe an association of the second color point of the first freeform gradient and the second color point of the second freeform gradient.

If the second corresponding grid element of the second grid does not have a second color point of the second freeform gradient, then the style mapping module 206 determines whether a neighboring grid element of the second corresponding grid element has a second color point of the second freeform gradient. If this neighboring grid element does not have a second color point of the second freeform gradient, then the style mapping module 206 determines whether another neighboring grid element of the second corresponding grid element has a second color point of the second freeform gradient. The style mapping module 206 continues to determine whether neighboring grid elements of the second corresponding grid element have a second color point of the second freeform gradient until a nearest grid element of the second grid to the second corresponding grid element having a second color point of the second freeform gradient is determined. When the nearest grid element of the second grid to the second corresponding grid element having the second color point of the second freeform gradient is determined, the style mapping module 206 is implemented to associate the second color point of the first freeform gradient and the second color point of the second freeform gradient. Thus, the style mapping module 206 may detect the second color point of the second freeform gradient based on a closeness of a proximity of the second color point to the location represented by the corresponding grid element of the second grid. For example, the style mapping module 206 can generate first object data 218 and mapped second object data 220 describing an association of the second color point of the first freeform gradient and the second color point of the second freeform gradient.

In this way, the style mapping module 206 continues to associate color points of the first freeform gradient with color points of the second freeform gradient until all of the color points of the first freeform gradient are associated with a color point of the second freeform gradient. In an example in which the second freeform gradient has additional color points that are not associated with a color point of the first freeform gradient, the style mapping module 206 can be implemented to generate the mapped second object data 220 to describe these additional color points of the second freeform gradient. Continuing this example, these additional color points of the second freeform gradient can be appended to the ordered or associated color points. For example, the mapped second object data 220 can include the input data 120, the first object style data 210, the second object style data 212, the first object grid data 214, the second object grid data 216, etc.

In one example, the first object data 218 and the mapped second object data 220 may describe a color point or color points which are representations of a color line or color lines. In this example, the blending module 110 may represent color lines as points corresponding to geometrical centers of the lines and the blending module can be implemented to associate a color line of the first freeform gradient and a color line of the second freeform gradient in the same manner as associating a color point of the first freeform gradient and a color point of the second freeform gradient. In this way, the blending module 110 may associate color points with color lines and/or color lines with color points. In one example, the blending module 110 may associate a color point of the first freeform gradient and a color line of the second freeform gradient or the blending module 110 can associate a color line of the first freeform gradient and a color point of the second freeform gradient. In one or more implementations, the first object data 218 and the mapped second object data 220 describes the associations of color points and/or color lines of the first freeform gradient with color points and/or color lines of the second freeform gradient.

The interpolation module 208 is illustrated as receiving the first object data 218 and the mapped second object data 220, and the interpolation module 208 is implemented to process the first object data 218 and the mapped second object data 220 to interpolate color points or lines of the first freeform gradient with the associated color points of lines of the second freeform gradient. For example, the interpolation module 208 may interpolate the first color point of the first freeform gradient and the first color point of the second freeform gradient to generate a blend object 122 of the freeform gradients. In this example, the interpolation module 208 may interpolate a color value of the first color point of the first freeform gradient and a color value of the first color point of the second freeform gradient. In some examples, this interpolation is a linear interpolation but the interpolation can also be a non-linear interpolation. In this example, the interpolation module 208 may interpolate the second color point of the first freeform gradient and the second color point of the second freeform gradient to generate the blend object 122 of the freeform gradients. In this manner, the blending module 110 generates a blend object 122 of the first object 114 having the first freeform gradient and the second object 118 having the second freeform gradient by interpolating associated color points of the first and the second freeform gradient. In some examples, the blending module 110 includes a rendering module, and the blending module 110 can implement the rendering module to render the blend object 122 in the user interface 116.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIG. 1 and FIG. 2.

FIG. 3 is a flow diagram depicting a procedure 300 in an example implementation in which a first freeform gradient of a first object and a second freeform gradient of a second object are interpolated based on a color point of the first freeform gradient and a corresponding color point of the second freeform gradient. At least one color point of a first freeform gradient of a first object is identified and at least two color points of a second freeform gradient of a second object are identified (block 302). For example, the identification module 202 identifies the at least one color point of the first freeform gradient of the first object 114 and the at least two color points of the second freeform gradient of the second object 118.

A first grid is generated on the first object and a second grid is generated on the second object, the first grid and the second grid having an equal number of grid elements (block 304). In one example, the grid module 204 is implemented to generate the first grid on the first object 114 and generate the second grid on the second object 118. For example, the grid module 204 can generate the first grid and the second grid such that the first and second grid have a same number of grid elements. In this example, generating the first and second grid as having the same number of grid elements can account for differences in geometries of objects by establishing a one-to-one correspondence between the first and second grid. In particular, this same number of grid elements can be evenly distributed on objects of varying sizes such that a smaller object may have smaller grid elements and a larger object can have larger gird elements. A grid element of the first grid is identified having the at least one color point of the first freeform gradient (block 306). In another example, the grid module 204 is implemented to identify the grid element of the first grid having the at least one color point of the first freeform gradient.

The grid element of the first grid is mapped to a corresponding grid element of the second grid (block 308). For example, the style mapping module 206 is implemented to map the grid element of the first grid to the corresponding grid element of the second grid. A nearest color point of the second grid to the corresponding grid element is determined (block 310), the nearest color point of the at least two color points of the second freeform gradient. In one or more implementations, the style mapping module 206 determines the nearest color point of the second grid to the corresponding grid element.

The at least one color point of the first freeform gradient and the nearest color point of the at least two color points of the second freeform gradient are interpolated to generate a blend object of the first object and the second object (block 312). For example, the interpolation module 208 is implemented to interpolate the color point of the first freeform gradient and the nearest color point of the at least two color points of the second freeform gradient to generate the blend object of the first object and the second object.

Freeform Gradient Style Blending

Figure 4:
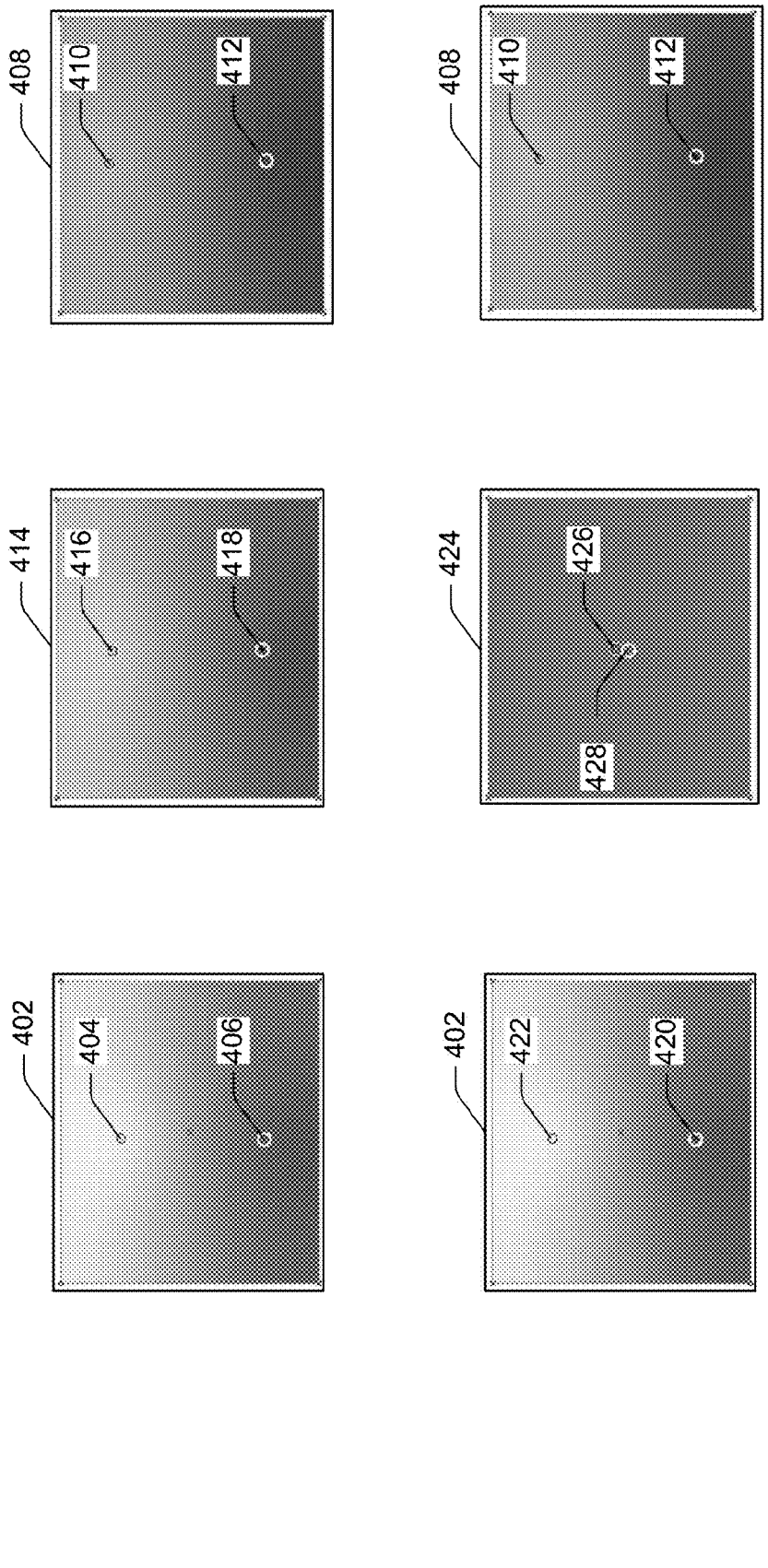
FIG. 4 is an illustration depicting an example representation which demonstrates a significance of an order of interpolation of color points of a first freeform gradient and a second freeform gradient for generation of a blend object.

FIG. 4 is an illustration depicting an example representation 400 which demonstrates a significance of an order of interpolation of color points of a first freeform gradient and a second freeform gradient for generation of a blend object. The representation 400 is illustrated as including a first object 402 having a first freeform gradient which has a first color point 404 and a second color point 406. The representation 400 also includes a second object 408 having a second freeform gradient which also has a first color point 410 and a second color point 412. An example of a blend object 414 generated from the first object 402 and the second object 408 is illustrated in the representation 400. In this example, the blend object 414 includes a first interpolated color point 416 based on an interpolation of the first color point 404 of the first object 402 and the first color point 410 of the second object 408. The blend object 414 also includes a second interpolated color point 418 based on an interpolation of the second color point 406 of the first object 402 and the second color point 412 of the second object 408.

Consider an example in which an order of interpolation of the color points of the first object 402 is reversed. In this example, color point 420 is now the first color point of the first object 402 and color point 422 is now the second color point of the first object 402. Again, the color points 420 and 422 only represent a different order of color points 404 and 406 and nothing else has changed in this example relative to the previous example. An example of a blend object 424 generated from the first object 402 and the second object 408 is illustrated. In this example, the blend object 424 is generated by interpolating the first color point 420 of the first object 402 and the first color point 410 of the second object 408. This interpolation is represented as a first interpolated color point 426 of the blend object 424. The blend object 424 also includes a second interpolated color point 428 based on interpolation of the second color point 422 of the first object 402 and the second color point 412 of the second object 408.

As shown in FIG. 4, the blend object 414 generated from the first object 402 and the second object 408 based on the first order of interpolation is visually pleasing and the blend object 414 has features that are visually indicative that the blend object 414 is a natural combination of the first object 402 and the second object 408. However, the blend object 424 generated from the first object 402 and the second object 408 based on the second order of interpolation is not visually pleasing and the blend object 424 has no features that are visually indicative that the blend object 424 is a natural combination of the first object 402 and the second object 408. In these examples, generating the blend object 414 by interpolating color points in the first order and generating the blend object 424 by interpolating color points in the second order illustrates the significance of the order of interpolation of color points of a first freeform gradient and a second freeform gradient.

Figure 5B:
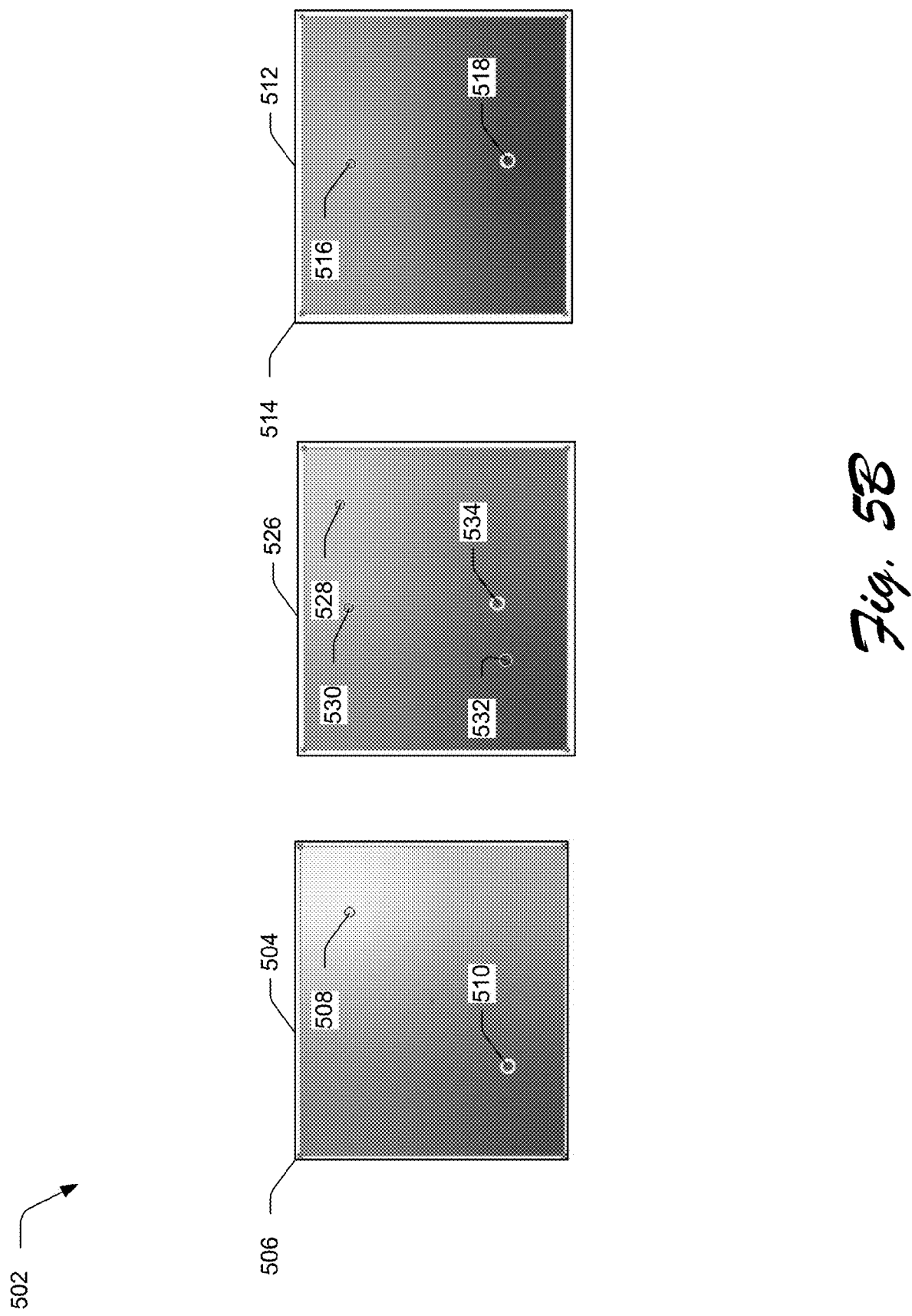

FIGS. 5A and 5B are illustrations depicting examples of blend objects generated from freeform gradients. FIG. 5A is an illustration depicting an example representation 500 of an order of interpolation of color points by associating the color points based on a relative distance to a fixed reference point. FIG. 5B is an illustration depicting an example representation 502 of a blend object generated from color points of a first and second object without interpolation of the color points. Representation 500 is illustrated to include a first object 504 having a first freeform gradient. The first object 504 has a fixed reference point 506 and the first freeform gradient has a first color point 508 and a second color point 510. As shown in FIG. 5A, the first color point 508 is a first distance from the fixed reference point 506 and the second color point 510 is a second distance from the fixed reference point 506. In this example, the first distance from the fixed reference point 506 is greater than the second distance from the fixed reference point 506. In one or more implementations, the first object data 118 and/or the mapped second object data 220 may describe the first color point 508 as being the farthest color point from the fixed reference point 506 of the first object 504 and the first object data 118 and/or the mapped second object data 220 may also describe the second color point 510 as being the closest color point to the fixed reference point 506.

The representation 500 also includes a second object 512 having a second freeform gradient. The second object 512 has a fixed reference point 514 and the second freeform gradient has a first color point 516 and a second color point 518. In one example, the fixed reference point 514 of the second object 512 corresponds to the fixed reference point 506 of the first object 504. The first color point 516 is a first distance from the fixed reference point 514 and the second color point 518 is a second distance from the fixed reference point 514. In this example, the second distance from the fixed reference point 514 is greater than the first distance from the fixed reference point 514. In one example, the first object data 118 and/or the mapped second object data 220 may describe the first color point 516 as being the closest color point to the fixed reference point 514 of the second object 512 and the first object data 118 and/or the mapped second object data 220 may also describe the second color point 518 as being the farthest color point from the fixed reference point 514.

As shown in FIG. 5A, a blend object 520 is generated from the first object 504 and the second object 512 using an order of color point interpolation that is based on distance between the fixed reference points 506 and 514 and the color points of the first freeform gradient and the second freeform gradient. In particular, the second color point 510 of the first freeform gradient is the closest to the fixed reference point 506 and the first color point 516 of the second freeform gradient is the closest to the fixed reference point 514. Based on this spatial relationship, the second color point 510 of the first freeform gradient is associated with the first color point 516 of the second freeform gradient. For example, the blending module 110 may be implemented to associate the second color point 510 and the first color point 516. Accordingly, interpolated color point 522 represents an interpolation of the second color point 510 of the first freeform gradient and the first color point 516 of the second freeform gradient.

The first color point 508 of the first freeform gradient is the farthest from the fixed reference point 506 and the second color point 518 of the second freeform gradient is the farthest from the fixed reference point 514. The blending module 110 may associated the first color point 508 and the second color point 518 based on the spatial relationship of the color points 508 and 518 being the farthest points from reference points 506 and 514, respectively. Thus, interpolated color point 524 represents an interpolation of the first color point 508 of the first freeform gradient and the second color point 518 of the second freeform gradient.

In this example, the blend object 520 generated from the first object 504 and the second object 512 by associating the color points of the first freeform gradient and the color points of the second freeform gradient based on respective distances to fixed reference points 506 and 514 is not aesthetically pleasing. Additionally, the blend object 520 has no features which suggest that the blend object is a combination of the first object 504 and the second object 512.

As shown in FIG. 5B, the representation 502 includes the same first object 504 and second object 512 from the previous example. In this example, a blend object 526 is generated from the first object 504 and the second object 512 without interpolation of color pints 508, 510, 516, and 518. Instead of associating color points from the first freeform gradient and the second freeform gradient for interpolation to generate a blend object, blend object 526 is generated using representations of all of the color points from the first freeform gradient and all of the color points of the second freeform gradient. Accordingly, the blend object 526 in this example includes color points 528-534.

The blend object 526 generated using color points 528-534 is visually pleasing and the blend object 526 does have features that visually indicate that the blend object is a combination of the first object 504 and the second object 512. However, the features of the blend object 526 do not suggest that the blend object is a blended combination of the first object 504 and the second object 512. For example, the first freeform gradient of the first object 504 has two color points and the second freeform gradient of the second object 512 has two color points, and a blend object of the these two objects would also have two color points. Instead, the blend object 526 has four color points 528-534. Additionally, generating the blend object 526 in the manner illustrated in the representation 502 can be computationally expensive.

Consider an example in which a blend object is generated from a first object having a first freeform gradient with two color points and a second object having a second freeform gradient with nine color points. The blend object in this example should have two color points since the object of these two objects having the lowest number of color points is the first object having the two color points. However, the blend object in this example would have 11 color points based on the technique illustrated in the representation 502. Now consider an example in which a blend object is generated from the first freeform gradient with two color points, the second freeform gradient with nine color points, and a third freeform gradient having six color points. Again, the blend object generated in this example should have two color points based on the lowest number of color points of the first freeform gradient, but this example blend object would have 17 color points. As these examples demonstrate, the technique illustrated in the representation 502 can be computationally expensive if several objects are blended in this way.

FIG. 6 is an illustration depicting an example representation 600 of generating a first grid on a first object and a second grid on a second object. The representation 600 includes a first object 602 having a first freeform gradient which includes a first color point 604 and a second color point 606. The representation 600 also includes a second object 608 having a second freeform gradient which includes a first color point 610 and a second color point 612. In this example, the blending module 110 is implemented to generate a first grid on the first object 614 and a second grid on the second object 616. For example, the grid module 204 can be implemented to generate the first grid on the first object 614 and the second grid on the second object 616. As shown in FIG. 6, the first grid and the second grid have an equal number of grid elements.

In this example, the first and second grids are two-dimensional grids such that any grid element of the grids may be uniquely identified by a pair of coordinates. For example, and with reference to the upper left corner of object 614, a grid element having the first color point 604 is identifiable by (I, J) coordinates of I=3 and J=11 and a grid element having the second color point 606 is identifiable by (I, J) coordinates of I=12 and J=4. Similarly, and with reference to the upper left corner of object 616, a grid element having the first color point 610 is identifiable by (I, J) coordinates of I=3 and J=7 and a grid element having the second color point 612 is identifiable by (I, J) coordinates of I=11 and J=8.

Figure 7A:
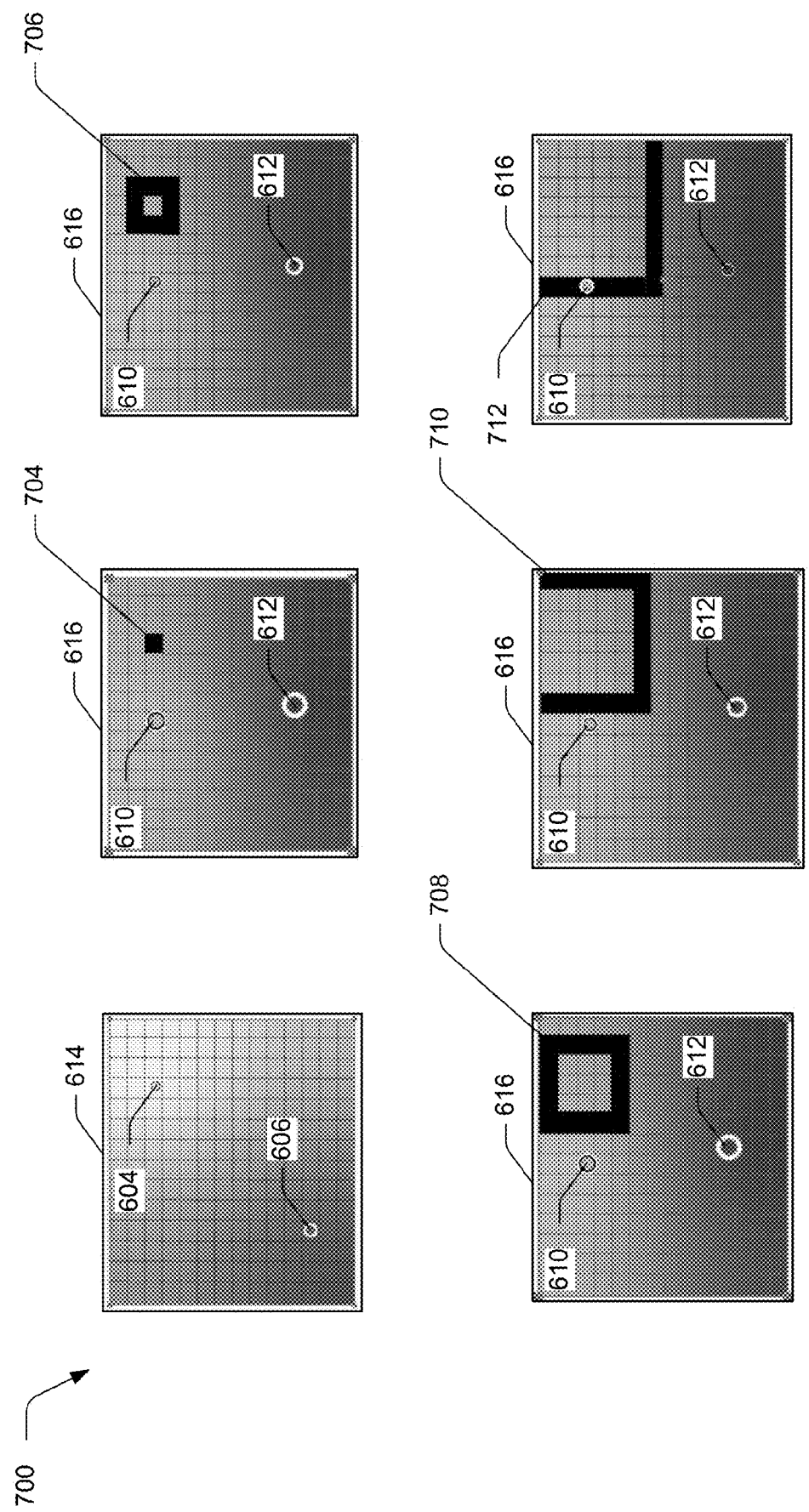
FIGS. 7A and 7B are illustrations depicting example representations in which color points are identified in a first freeform gradient and corresponding color points are determined in a second freeform gradient.
Figure 7B:
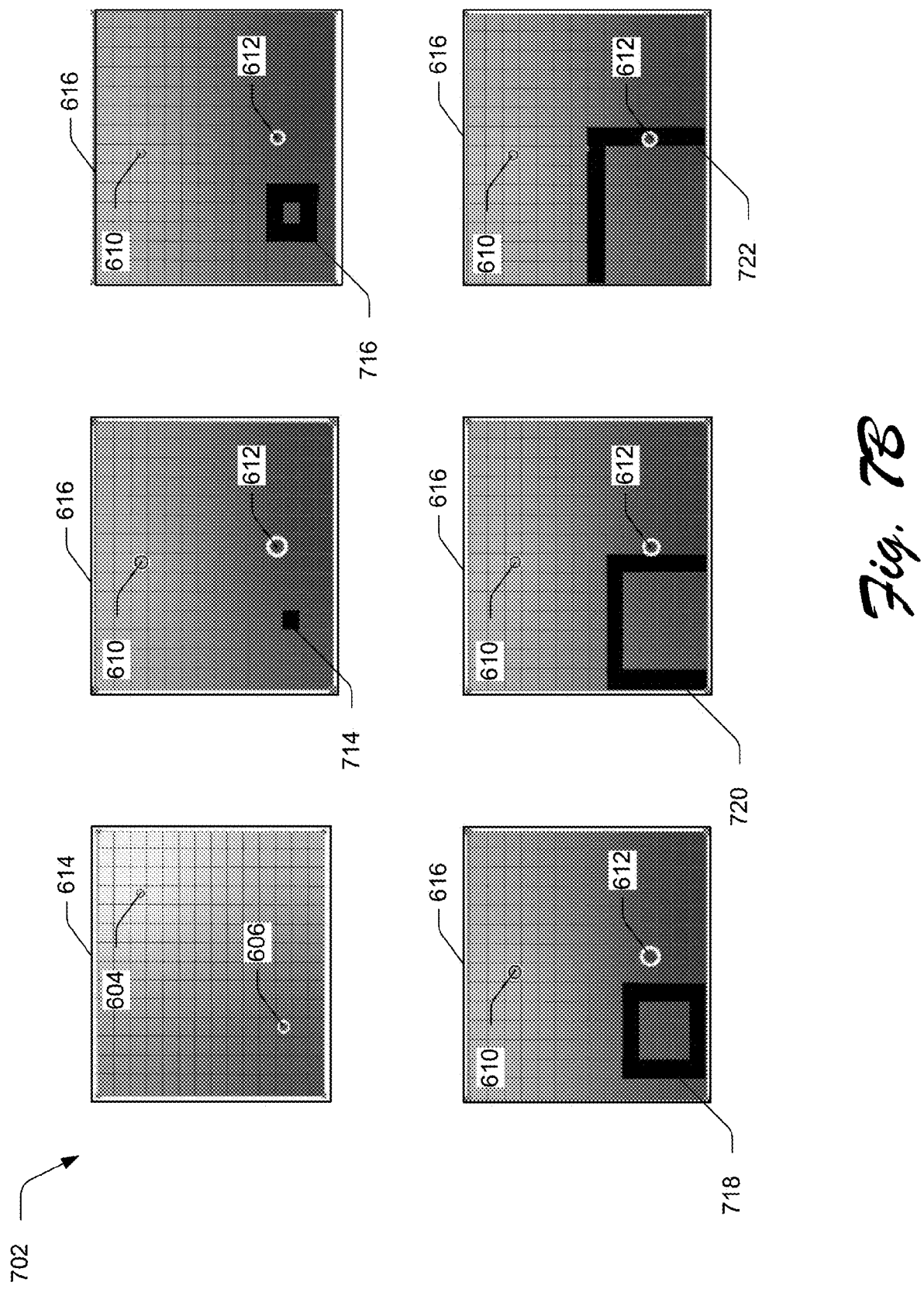

FIGS. 7A and 7B are illustrations depicting example representations in which color points are identified in a first freeform gradient and corresponding color points are determined in a second freeform gradient. FIG. 7A illustrates a representation 700 of determining a color point of the second object 616 to associate with the first color point 604 of the first object 614. FIG. 7B illustrates a representation 702 of determining a color point of the second object 616 to associate with the second color point 606 of the first object 614. As shown in FIG. 7A, the blending module 110 identifies the first color point 604 of the first object 614 and the blending module 110 identifies a grid element having the first color point 604 as the grid element having (I, J) coordinates of I=3 and J=11. The blending module 110 maps the grid element having the first color point 604 to a corresponding grid element of the second grid which is represented by 704. The blending module 110 determines if the corresponding grid element 704 has a color point of the second object 616. If the corresponding grid element 704 had a color point of the second object 616, then the blending module would be implemented to associate that color point and the first color point 604 for interpolation. In this example, the corresponding grid element 704 does not have the first color point 610 or the second color point 612 of the second object.

Since the corresponding grid element 704 does not have the first color point 610 or the second color point 612, the blending module 110 determines whether neighboring grid elements 706 have a color point of the second object 616. In this example, neighboring grid elements 706 also do not have the first color point 610 or the second color point 612. Because the neighboring grid elements 706 do not have a color point of the second object 616, the blending module 110 determines whether next neighboring grid elements 708 have a color point of the second object 616. The next neighboring grid elements 708 do not have the first color point 610 or the second color point 612. Since the next neighboring grid elements 708 also do not have a color point of the second object 616, the blending module 110 determines whether next neighboring grid elements 710 have a color point of the second object 616. In this example, the next neighboring grid elements 710 do not have the first color point 610 or the second color point 612. Accordingly, the blending module 110 determines whether next neighboring grid elements 712 have a color point of the second object 616. As shown in FIG. 7A, the next neighboring grid elements 712 have the first color point 610. The blending module 110 is implemented to associate the first color point 610 of the second freeform gradient and the first color point 604 of the first freeform gradient for interpolation. In this example, and with reference to object 616, the grid element of the second grid identifiable by (I, J) coordinates of I=3 and J=7 is the grid element that has the first color point 610.

As shown in FIG. 7B, the blending module 110 identifies the second color point 606 of the first object 614 and the blending module 110 identifies a grid element having the second color point 606 as the grid element having (I, J) coordinates of I=12 and J=4. The blending module 110 maps the grid element having the second color point 606 to a corresponding grid element of the second grid which is represented by 714. The blending module 110 determines if the corresponding grid element 714 has a color point of the second object 616. In this example, the blending module 110 may ignore the first color point 610 in this determination because the first color point 610 is already associated with a color point of the first freeform gradient. If the corresponding grid element 714 had a color point of the second object 616, then the blending module would be implemented to associate that color point and the second color point 606 for interpolation. In this example, the corresponding grid element 714 does not have the first color point 610 or the second color point 612 of the second object. Again, if the corresponding grid element 714 had the first color point 610, then the blending module 110 would not associate the first color point 610 and the second color point 606 because the first color point 610 is already associated with the first color point 604.

Since the corresponding grid element 714 does not have the first color point 610 or the second color point 612, the blending module 110 determines whether neighboring grid elements 716 have a color point of the second object 616. In this example, neighboring grid elements 716 also do not have the first color point 610 or the second color point 612. Because the neighboring grid elements 716 do not have a color point of the second object 616, the blending module 110 determines whether next neighboring grid elements 718 have a color point of the second object 616. The next neighboring grid elements 718 do not have the first color point 610 or the second color point 612. Since the next neighboring grid elements 718 also do not have a color point of the second object 616, the blending module 110 determines whether next neighboring grid elements 720 have a color point of the second object 616. In this example, the next neighboring grid elements 720 do not have the first color point 610 or the second color point 612. Accordingly, the blending module 110 determines whether next neighboring grid elements 722 have a color point of the second object 616. As shown in FIG. 7B, the next neighboring grid elements 722 have the second color point 612. The blending module 110 is implemented to associate the second color point 612 of the second freeform gradient and the second color point 606 of the first freeform gradient for interpolation. In this example, and with reference to object 616, the grid element of the second grid identifiable by (I, J) coordinates of I=11 and J=8 is the grid element that has the second color point 612.

FIG. 8 is an illustration depicting an example representation 800 in which color points of a first freeform gradient and corresponding color points of a second freeform gradient are interpolated to generate a blend object. The representation 800 includes the first object 614 having the first color point 604 and the second color point 606 as well as the second object 616 having the first color point 610 and the second color point 612. The blending module 110 is implemented to generate a blend object 802 from the first object 614 and the second object 616 by interpolating the first color point 604 and the second color point 610. Interpolated color point 804 represents the interpolation of the first color point 604 and the second color point 610 in the blend object 802. The blending module 110 also interpolates the second color point 606 and the second color point 612 to generate the blend object 802. Interpolated color point 806 represents the interpolation of the second color point 606 and the second color point 612.

As shown in FIG. 8, the blend object 802 generated by mapping grid elements of the first grid to corresponding grid elements of the second grid and determining nearest grid elements to the corresponding grid elements having color points to determine order of color point interpolation is aesthetically pleasing. The blend object 802 has features indicative that the blend object 802 is a blended combination of the first object 614 and the second object 616. The blend object 802 has a number of color points equal to a number of color points of the object having the least color points which could be either the first object 614 or the second object 616 in this example.

FIG. 9 is a flow diagram depicting a procedure 900 in an example implementation in which a blend object is generated of a first object having a first freeform gradient and a second object having a second freeform gradient. A first color point is detected at a first location in a first freeform gradient, the first color point at least partially defining color diffusion of the first freeform gradient of a first object (block 902). A second location in a second freeform gradient of a second object is identified based on the first location (block 904). A second color point of a plurality of color points that at least partially define color diffusion of the second freeform gradient is detected, the detection based on a proximity of the second color point to the second location (block 906). A blend object is generated of the first and second object by interpolating the first color point and the second color point (block 908). The blend object is rendered in a user interface of a display device (block 910).

Figure 10:
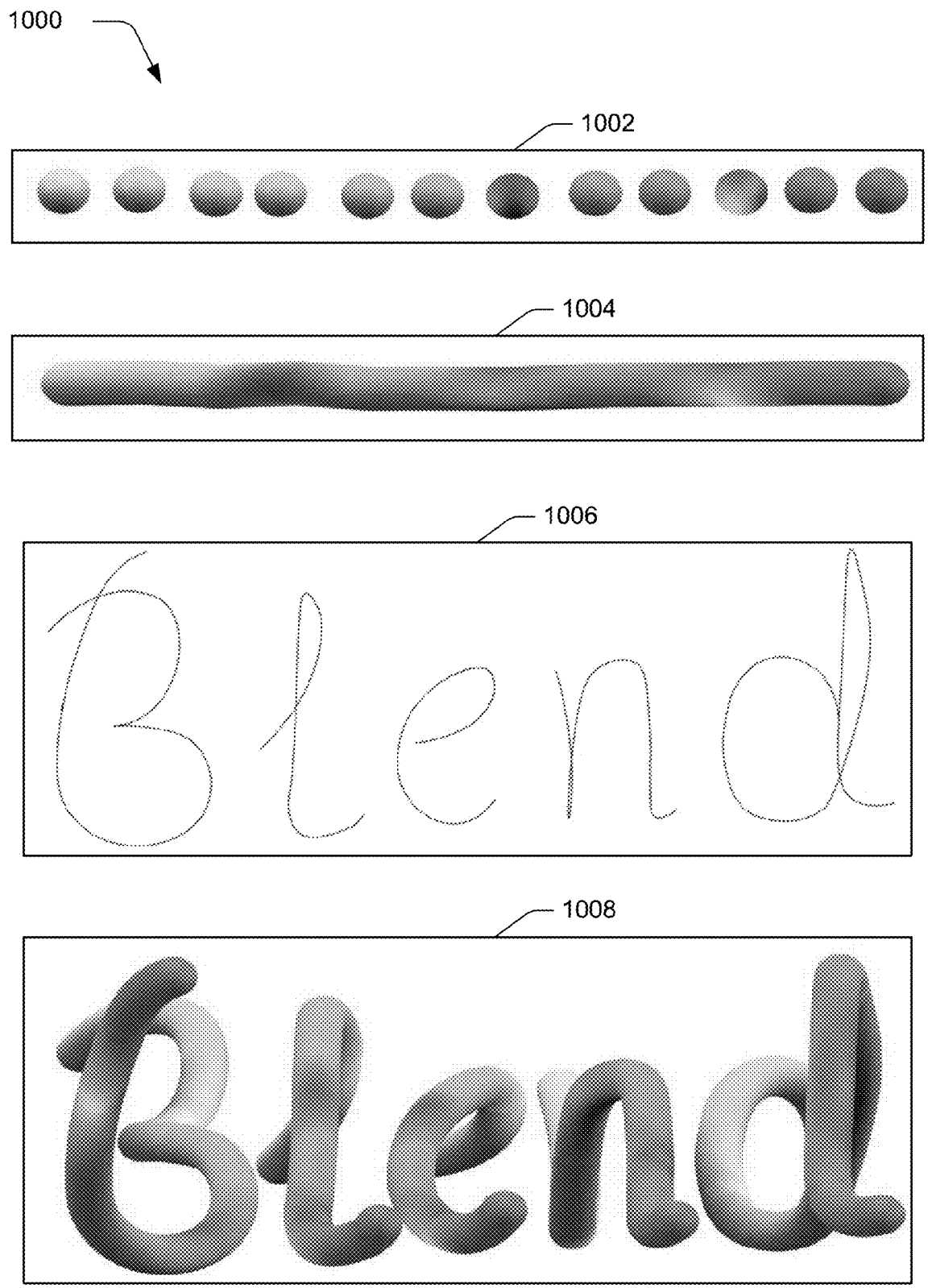
FIG. 10 is an illustration depicting example representations in which freeform gradient style is blended.

FIG. 10 is an illustration 1000 depicting example representations in which freeform gradient style is blended. Representation 1002 illustrates input objects to be blended. In this example, representation 1002 includes 12 objects each having a unique freeform gradient. Representation 1004 illustrates a blend object generated from the 12 objects using the systems and techniques described herein. Representation 1006 illustrates an input object to blend with the blend object of representation 1004. Representation 1008 illustrates a blend object generated the object illustrated in representation 1006 and the object illustrated in representation 1004.

Example System and Device

Figure 11:
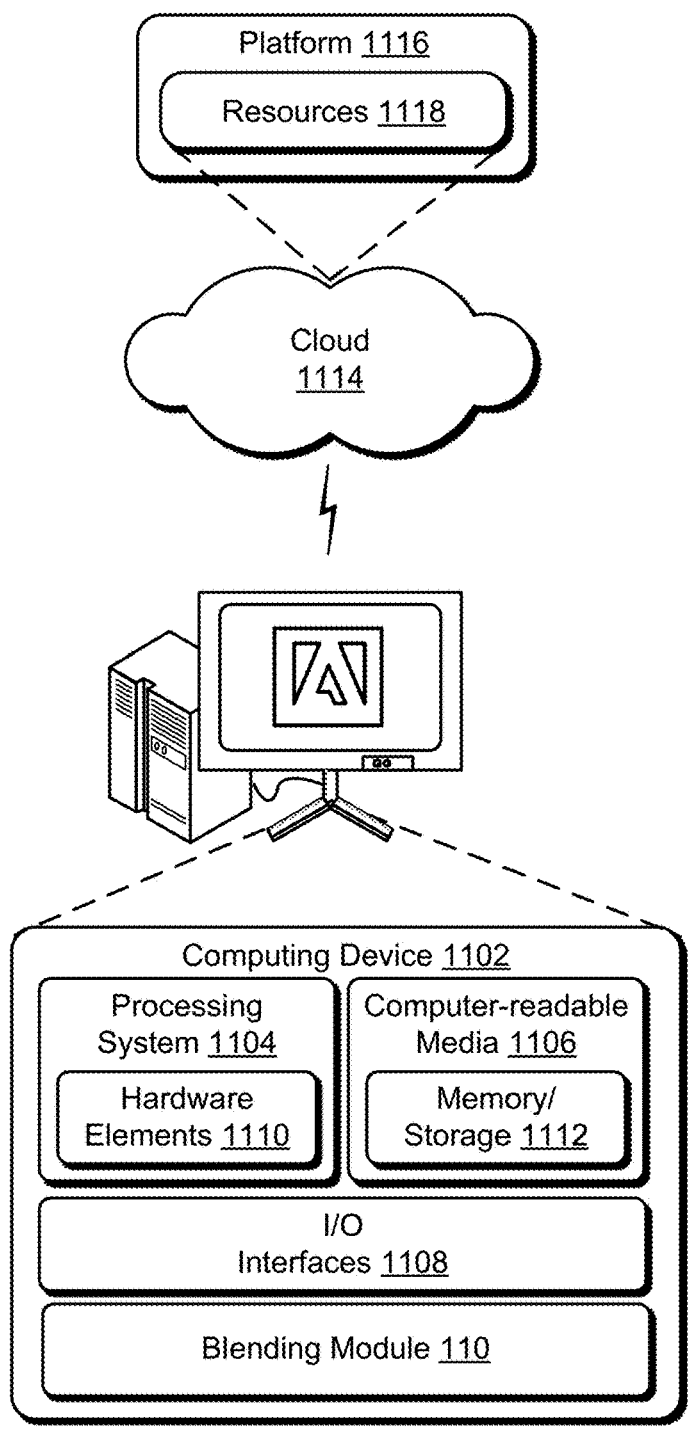
FIG. 11 illustrates an example system that includes an example computing device that is representative of one or more computing systems and/or devices that may implement the various techniques described herein.

FIG. 11 illustrates an example system 1100 that includes an example computing device that is representative of one or more computing systems and/or devices that may implement the various techniques described herein. This is illustrated through inclusion of the blending module 110. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1008 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources 1118 and functions to connect the computing device 1102 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the implementation of freeform gradient style blending has been described in language specific to structural features and/or methods, it is to be understood that the appended claims are not necessarily limited to the specific features or methods described. Rather, the specific features and methods are disclosed as example implementations freeform gradient style blending, and other equivalent features and methods are intended to be within the scope of the appended claims. Further, various different examples are described and it is to be appreciated that each described example can be implemented independently or in connection with one or more other described examples.

What is claimed is:

1. In a digital medium environment to blend objects having freeform gradients, a method implemented by a computing device, the method comprising:
   receiving, by the computing device, input data describing:
      a first object having a first geometry and a first freeform gradient that has a first color diffusion pattern at least partially defined by locations of color points included in a first set of color points within the first geometry; and
      a second object having a second geometry and a second freeform gradient that has a second color diffusion pattern at least partially defined by locations of color points included in a second set of color points within the second geometry;
   generating, by the computing device, a first grid on the first geometry and a second grid on the second geometry, the first grid and the second grid having a same number of grid elements;
   detecting, by the computing device, a first color point of the color points included in the first set at a first location within the first geometry;
   identifying, by the computing device, a second location within the second geometry based on coordinates of a grid element of the first grid having a majority of the first color point and a grid element of the second grid having the coordinates of the grid element of the first grid;
   detecting, by the computing device, a second color point of the color points included in the second set based on a proximity of the second color point to the second location;
   associating, by the computing device, the first color point and the second color point in an order of interpolation of the color points included in the first set and the color points included in the second set;
   generating, by the computing device for display in a user interface of a display device, a blend object of the first and second objects based on the order of interpolation.

2. The method as described in claim 1, wherein a number of the color points included in the first set is different from a number of the color points included in the second set.

3. The method as described in claim 1, wherein the second freeform gradient includes a color line.

4. The method as described in claim 1, wherein the first geometry is different from the second geometry.

5. The method as described in claim 1, further comprising a third color point of the color points included in the second set wherein the proximity of the second color point is closer to the second location than a proximity of the third color point with respect to the second location.

6. The method as described in claim 1, wherein the interpolating includes interpolating a color value of the first color point and a color value of the second color point.

7. The method as described in claim 1, wherein the interpolating is linear.

8. The method as described in claim 1, wherein the interpolating is non-linear.

9. The method as described in claim 1, wherein the order of interpolation is based on distances between the color points included in the first set and a reference point of the first geometry and distances between the color points included in the second set and a reference point of the second geometry.

10. The method as described in claim 1, wherein the order of interpolation is based on an order of generation of the color points included in the first set and the color points included in the second set.

11. The method as described in claim 1, wherein the second color point is not included in neighboring grid elements of the grid element of the second grid.

12. In a digital medium environment to blend objects having freeform gradients, a system comprising:
   an identification module implemented at least partially by hardware of a computing device to:
      receive input data describing:
         a first object having a first geometry and a first freeform gradient that has a first color diffusion pattern at least partially defined by locations of color points included in a first set of color points within the first geometry;
         a second object having a second geometry and a second freeform gradient that has a second color diffusion pattern at least partially defined by locations of color points included in a second set of color points within the second geometry; and detect a first color point of the color points included in the first set at a first location within the first geometry;

a grid module implemented at least partially by the hardware of the computing device to:

generate a first grid on the first geometry and a second grid on the second geometry, the first grid and the second grid having a same number of grid elements; and identify a second location within the second geometry based on coordinates of a grid element of the first grid having a majority of the first color point and a grid element of the second grid having the coordinates of the grid element of the first grid;

a style mapping module implemented at least partially by the hardware of the computing device to:

detect a second color point of the color points included in the second set based on a proximity of the second color point to the second location; and associate the first color point and the second color point in an order of interpolation of the color points included in the first set and the color points included in the second set; and an interpolation module implemented at least partially by the hardware of the computing device to generate a blend object of the first and second objects based on the order of interpolation.

13. The system as described in claim 12, further comprising a rendering module implemented at least partially by the hardware of the computing device to render the blend object for display in a user interface of a display device.

14. The system as described in claim 12, wherein a number of the color points included in the first set is different from a number of the color points included in the second set.

15. The system as described in claim 12, wherein the second freeform gradient includes a color line.

16. The system as described in claim 12, wherein the order of interpolation is based on distances between the color points included in the first set and a reference point of the first geometry and distances between the color points included in the second set and a reference point of the second geometry.

17. The system as described in claim 12, wherein the order of interpolation is based on an order of generation of the color points included in the first set and the color points included in the second set.

18. In a digital medium environment to blend objects having freeform gradients, a system comprising:

means for receiving input data describing:

a first object having a first geometry and a first freeform gradient that has a first color diffusion pattern at least partially defined by locations of color points included in a first set of color points within the first geometry; and a second object having a second geometry and a second freeform gradient that has a second color diffusion pattern at least partially defined by locations of color points included in a second set of color points within the second geometry;

means for detecting the locations of the first set of color points within the first geometry;

means for generating a first grid on the first geometry and a second grid on the second geometry, the first grid and the second grid having a same number of grid elements;

means for detecting a first color point of the color points included in the first set at a first location within the first geometry;

means for identifying a second location within the second geometry based on coordinates of a grid element of the first grid having a majority of the first color point and a grid element of the second grid having the coordinates of the grid element of the first grid means for determining an order of interpolation of the color points included in the first set and the color points included the second set, the first color point is associated with the second color point in the order of interpolation; and means for generating a blend object of the first and second objects based on the order of interpolation.

19. The system as described in claim 18, wherein the order of interpolation is based on an order of generation of the color points included in the first set and the color points included in the second set.

20. The system as described in claim 18, wherein the order of interpolation is based on distances between the color points included in the first set and a reference point of the first geometry and distances between the color points included in the second set and a reference point of the second geometry.

* * * * *